(12) United States Patent
Chen (10) Patent No.: US 10,070,494 B1
(45) Date of Patent: Sep. 4, 2018

(54) DIMMING SWITCH DEVICE AND METHODS FOR DETERMINING USER OPERATION EVENTS THEREOF

(71) Applicant: CVICLOUD CORPORATION, New Taipei (TW)

(72) Inventor: Chung-Yi Chen, New Taipei (TW)

(73) Assignee: CVICLOUD CORPORATION, New Taipei (TW)

( * ) Notice: Subject to any disclaimer, the term of this patent is extended or adjusted under 35 U.S.C. 154(b) by 0 days.

(21) Appl. No.: 15/896,313

(22) Filed: Feb. 14, 2018

(51) Int. Cl.
*H05B 37/02* (2006.01)
*H05B 33/08* (2006.01)

(52) U.S. Cl.
CPC ..... *H05B 33/0845* (2013.01); *H05B 37/0272* (2013.01)

(58) Field of Classification Search
CPC .................. H05B 33/0845; H05B 37/0272
USPC ......................................................... 326/291
See application file for complete search history.

(56) References Cited

U.S. PATENT DOCUMENTS

| | | | |
|---|---|---|---|
| 5,248,919 A | 9/1993 | Hanna et al. | |
| 5,583,484 A * | 12/1996 | Asano | B60Q 3/85 315/77 |
| 5,677,603 A * | 10/1997 | Speirs | B64D 11/00 315/324 |
| 6,930,260 B2 * | 8/2005 | Clegg | H01H 13/70 200/5 A |
| 7,687,940 B2 * | 3/2010 | Mosebrook | H05B 37/0209 307/115 |
| 8,823,266 B2 * | 9/2014 | Qin | H05B 33/0809 315/85 |
| 9,380,656 B2 * | 6/2016 | Radermacher | H05B 33/0815 |
| 9,516,717 B2 * | 12/2016 | Lin | H05B 33/0812 |
| 9,839,103 B2 * | 12/2017 | Avrahamy | H05B 37/0272 |
| 9,867,263 B2 * | 1/2018 | Avrahamy | H05B 37/0272 |
| 9,877,366 B2 * | 1/2018 | Xie | H05B 33/0845 |
| 9,936,547 B2 * | 4/2018 | Wang | H05B 33/0815 |
| 9,949,338 B2 * | 4/2018 | Wilson | H05B 37/02 |
| 2012/0242248 A1 | 9/2012 | Drummond et al. | |

FOREIGN PATENT DOCUMENTS

| | | |
|---|---|---|
| EP | 2934069 A1 | 10/2015 |
| JP | S63271896 A | 11/1988 |

* cited by examiner

*Primary Examiner* — Don Le
(74) *Attorney, Agent, or Firm* — Rosenberg, Klein & Lee (57) ABSTRACT

A dimming switch device includes a key switch having a switching element controlled to be open-circuit or closed-circuit, a rectifying diode to rectify input AC voltages according to the state of the switching element, a power state coupling circuit, a controller, and a driving circuit. The key switch and the power state coupling circuit together generate a signal to inform the controller whether the switching element is open-circuit or closed-circuit through a pair of power lines that transmit both the signal and the power required by the dimming switch device and an electric load driven by the driving circuit. Methods for determining user operation events over the dimming switch device are also provided as routines like: reset, one-click, N-click, so that a lamp load can be turned on and off and adjust brightness according to the user operation events.

15 Claims, 10 Drawing Sheets

DIMMING SWITCH DEVICE AND METHODS FOR DETERMINING USER OPERATION EVENTS THEREOF

BACKGROUND OF THE INVENTION

1. Field of the Invention

The present invention relates to a dimming switch device and methods for determining user operation events thereof; and in particular, to a dimming switch device with a light dimming function and methods to determine user operation events over the dimming switch device.

2. Description of the Prior Arts

Figure 8:
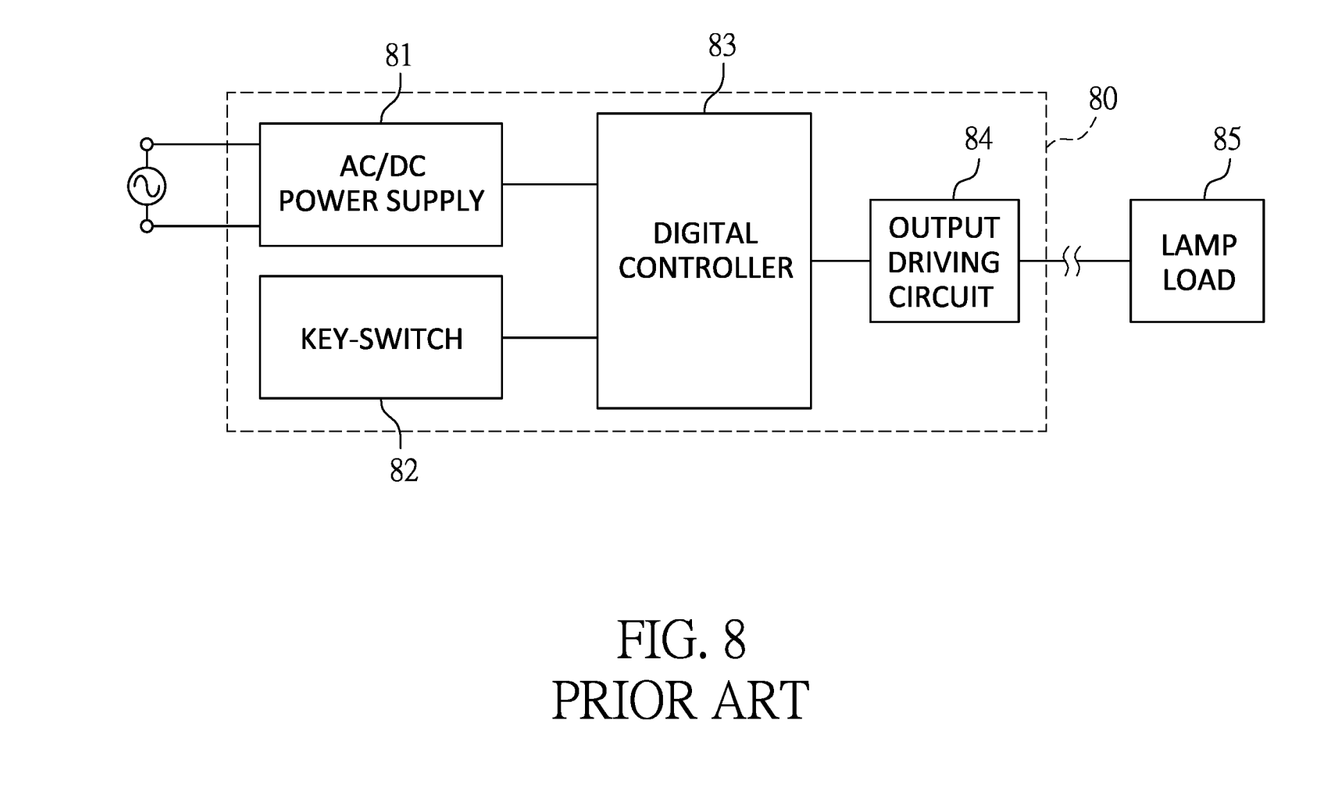
FIG. 8 is an overall circuit block diagram of a conventional dimming switch.

Conventional dimming switches are usually disposed on walls. As shown in FIG. 8, the dimming switch device 80 is disposed on the wall and has a digital controller 83, a key switch 82, an AC-to-DC power supply circuit 81 and an output driver circuit 84. Users can control the brightness of a lamp load 85 through the dimming switch device 80. Due to a considerable number of power electronic components within the dimming switch device 80, it has a significant volume and a need for heat dissipation so that a typical wall is not necessarily suitable for accommodating the dimming switch device 80.

Figure 9:
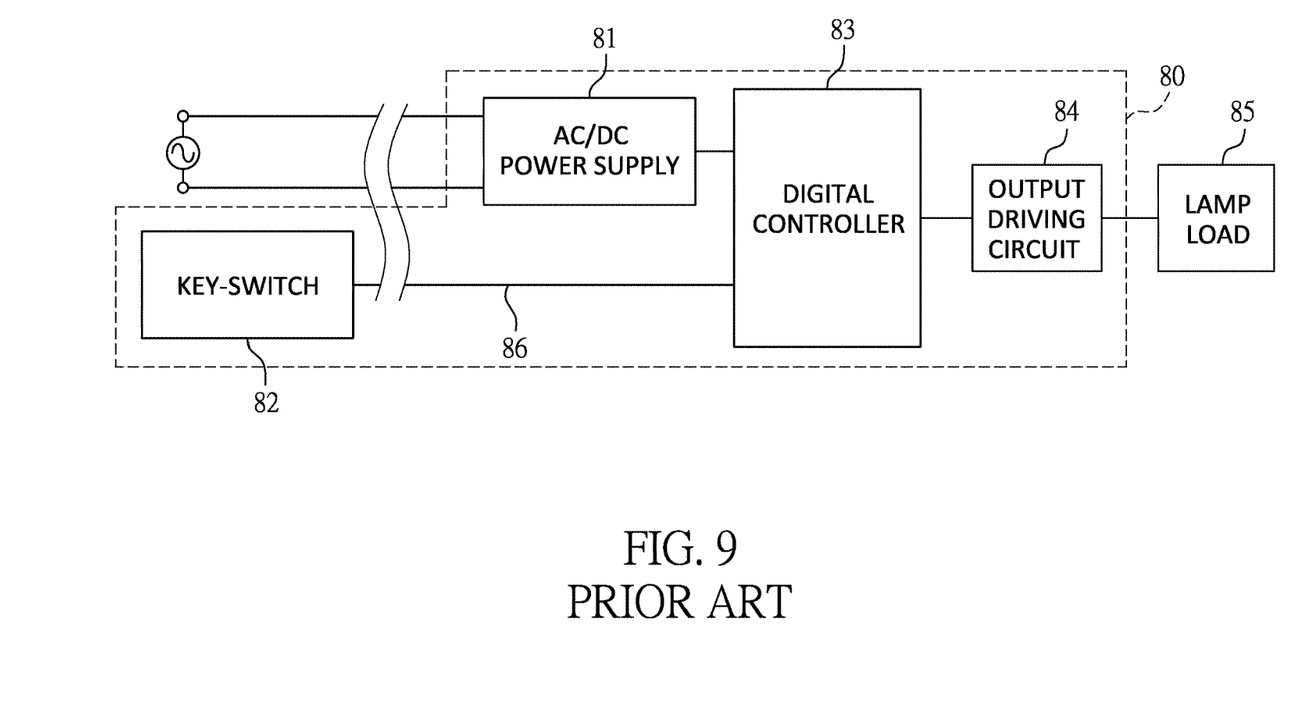
FIG. 9 is another overall circuit block diagram of a conventional dimming switch, wherein the key switch is installed away from the other circuits of the dimming switch.

Therefore, another conventional dimming switch device is shown in FIG. 9, wherein the digital controller 83, the AC-to-DC power supply circuit 81, and the output drive circuit 84 are repositioned from around the key switch 82's installation position on the wall to the lamp load 85's installation position which may be on the ceiling. In this way, the above-mentioned limitations of accommodation space and the heat dissipation can be greatly relieved. However, besides a pair of power wires, the key switch 82 installed on the wall will need a separate wire 86 to transmit its ON/OFF state information to the digital controller 83, thus, increasing the complexity of such an installation.

SUMMARY OF THE INVENTION

In view of the shortcomings of the conventional dimming switches due to the complexity of installation, the present invention provides a dimming switch device, comprising:
a key switch comprising,
   a common input terminal;
   a common output terminal;
   a switching element having an input terminal and an output terminal, wherein the switching element is controllable to be open-circuit or closed-circuit; and
   a rectifying diode having an input terminal and an output terminal;
   wherein the input terminal of the switching element and the input terminal of the rectifying diode are electrically connected to the common input terminal and further electrically connected to one polarity of an AC power source; and the output terminal of the switching element and the output terminal of the rectifying diode are electrically connected to the common output terminal; and
a power state coupling circuit comprising:
   a pair of input terminals electrically connected to the common output terminal of the key switch and the other polarity of said AC power source; and
   an output terminal;
   wherein the power state coupling circuit converts the AC voltage of the pair of input terminals to a DC signal which is transmitted to the output terminal of the power state coupling circuit;
a controller comprising:
   an input pin electrically connected to the output terminal of the power state coupling circuit;
   wherein the controller determines whether the switching element is open-circuit or closed-circuit according to voltage waveforms of the input pin.

When the switching element in the key switch is open-circuit, one polarity of the input AC power lines can only provide power to the dimming switch device through the rectifier diode, and when the switching element in the key switch is closed-circuit, the one polarity of the input AC power lines directly supplies power to the dimming switch device without being affected by the rectifier diode. Therefore, when the switching element in the key switch is open-circuit or closed-circuit, the corresponding output voltage waveforms of the common output terminal of the key switch will be different. Therefore, the power state coupling circuit can output different voltage waveforms to an input pin of the controller according to the output voltage waveforms of the common output terminal of the key switch The controller can thus determine whether the key switch is in an open state or a closed state, and at the same time, based on the durations of the open state or the closed state as well as the user operation sequences of the switching element, the controller can determine whether to turn off, to turn on, or to adjust the output of the driving circuit so as to control the electric load. The electric load may be a lamp or other electric appliances. As described above, since whether the switching element in the key switch is in the open circuit state or the closed circuit state can be directly sensed by the dimming switch device via the power lines, thus, only the pair of power lines between the key switch and the load is required, and needless to add other signal lines, so that the purpose of reducing the complexity of installation can be achieved.

Other objectives, advantages and novel features of the invention will become more apparent from the following detailed description when taken in conjunction with the accompanying drawings.

DETAILED DESCRIPTION OF THE PREFERRED EMBODIMENTS

The following, with the drawings and the preferred embodiments of the present invention, further illustrates the technical means that the present invention adopts to achieve the intended purpose.

Figure 1A:
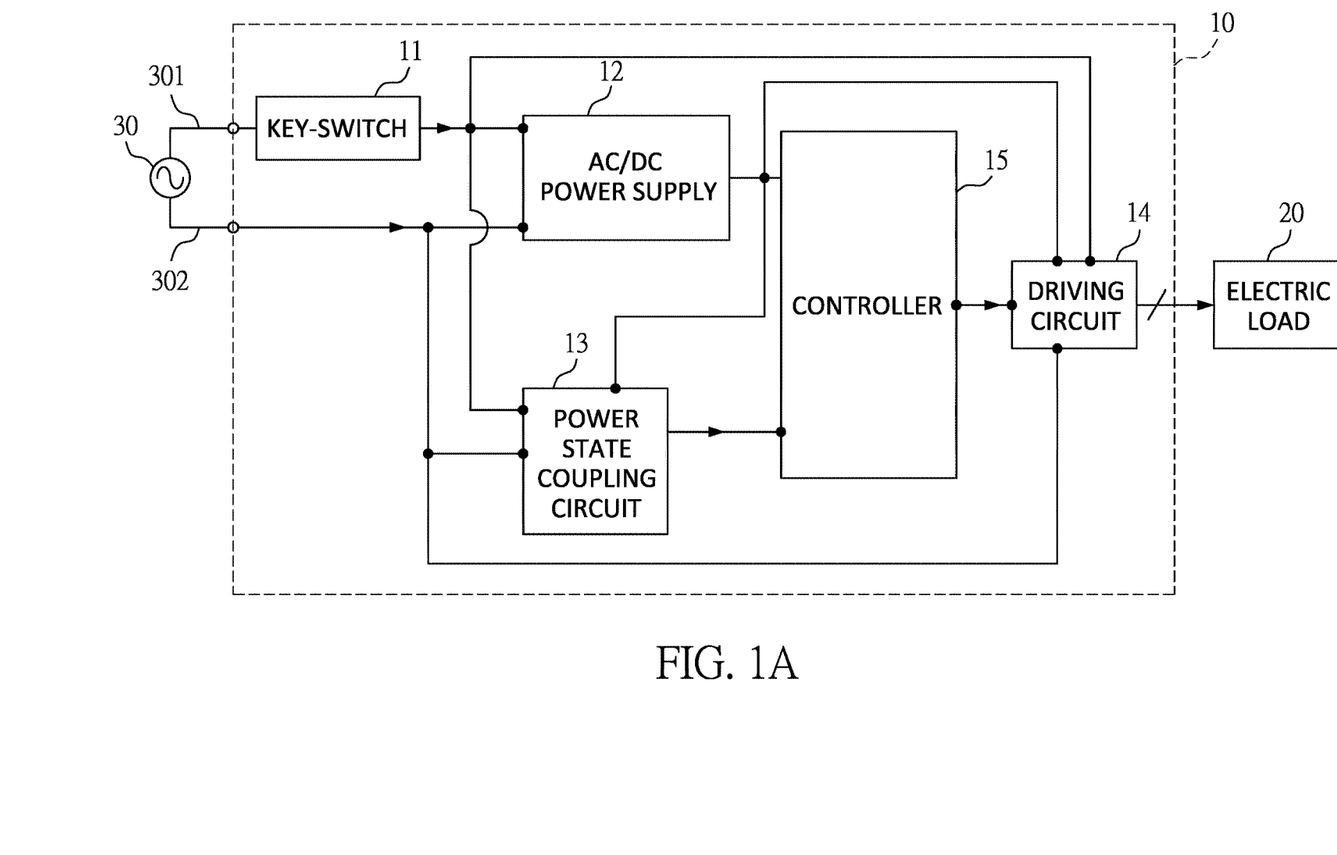
FIG. 1A is an overall circuit block diagram of the first preferred embodiment of this invention.
Figure 1B:
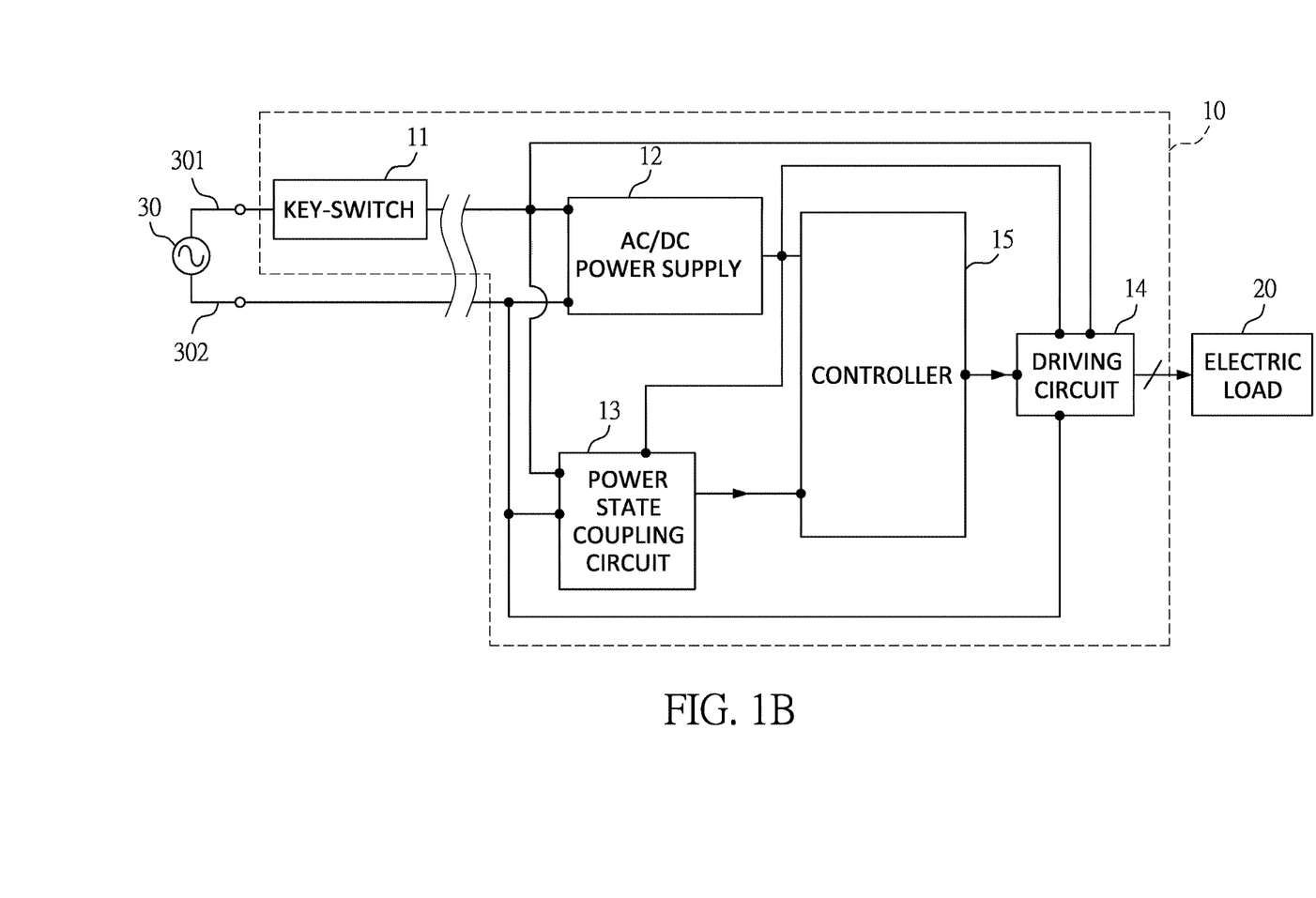
FIG. 1B is an overall circuit block diagram of the second preferred embodiment of this invention, wherein the key switch is installed away from the other circuits of the dimming switch device.

The first preferred embodiment of the present invention, referring to FIG. 1A, is a dimming switch device 10. The dimming switch device 10 of the present invention includes a key switch 11, an AC-to-DC power supply 12, a power state coupling circuit 13, a driving circuit 14, and a controller 15, wherein the driving circuit 14 is for driving an electric load, and wherein the key switch 11 can be installed in different areas away from the other circuits of the dimming switch device 10, such as the second preferred embodiment of this invention, referring to FIG. 1B, wherein the key switch 11 is installed on a wall, and the other circuits of the dimming switch device are installed with the lighting load 20. In this way, there is only one pair of AC power lines to connect the key switch 11 and the other circuits of the dimming switch device 10, said pair of AC power lines not only transmits electric power but also transmits the state of the key switch 11 to the other circuits of the dimming switch device 10.

Figure 2A:
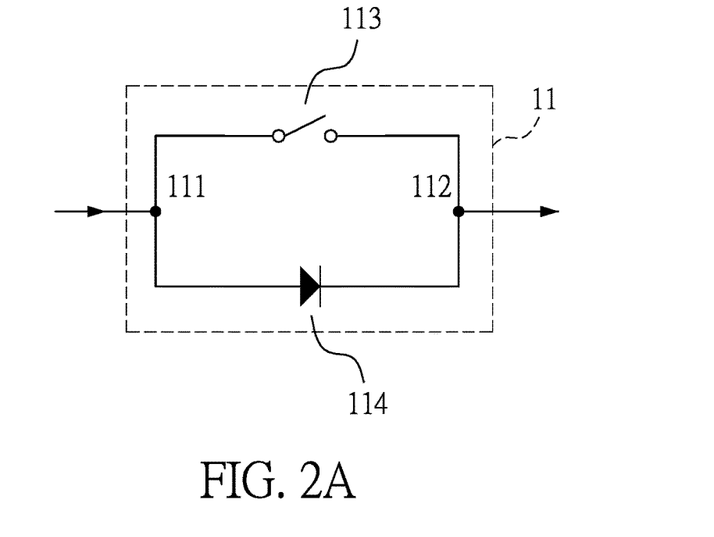
FIG. 2A is a circuit diagram of the key switch in the preferred embodiments shown in FIG. 1A and FIG. 1B.
Figure 2B:
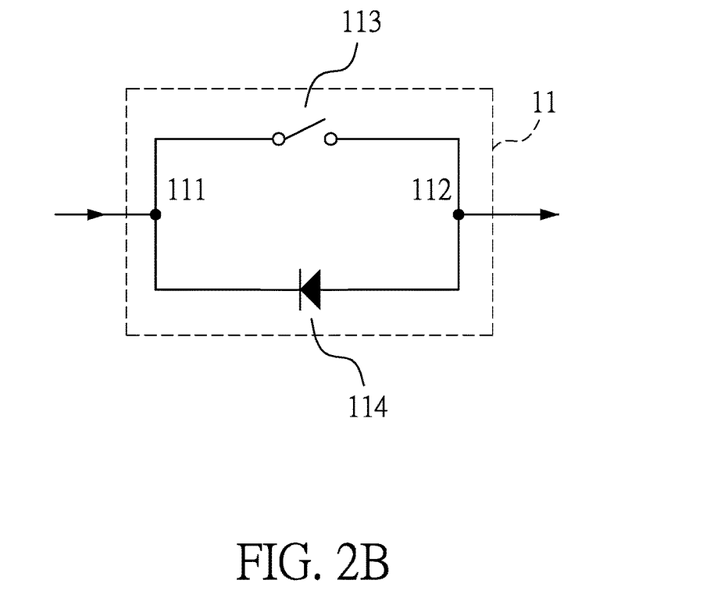
FIG. 2B is another circuit diagram of the key switch in the preferred embodiments shown in FIG. 1A and FIG. 1B.

Referring to FIG. 2A and FIG. 2B, the key switch 11 includes a common input terminal 111, a common output terminal 112, a switching element 113 with open-circuit/closed-circuit functions, and a rectifying diode 114; wherein the positive and negative ends of the rectifying diode 114 in FIG. 2A are reversed in FIG. 2B.

A user can control the switching element 113 to be either open-circuit or closed-circuit by way of general pressing, touch control, voice control or light control. The input terminal of the switching element 113 and the input terminal of the rectifying diode 114 are electrically connected to the common input terminal 111 and further electrically connected to one polarity 301 of an AC power source 30 (usually 43~67 Hz, 100~240V), and the output of the switching element 113 and the output of the rectifying diode 114 are all electrically connected to the common output terminal 112.

When the switching element 13 is in the open circuit state, the input voltage from the AC power source 30 will be rectified by the rectifying diode 114 before transmitted to the common output terminal 112. And when the switching element 13 is in the closed circuit state, the input voltage from the AC power source 30 will be transmitted to the common output terminal 112 directly through the switching element 13 without going through the rectifying diode 114. Thus the voltage at the common output terminal 112 of the key switch 11 will have a rectified voltage waveform when the switching element is in the open circuit state, and the voltage will have a normal AC voltage waveform when the switching element 13 is in the closed circuit state. As described above, it can be seen that the state of the key switch 11 is determined by the open circuit state and the closed circuit state of the switching circuit 113, and therefore the open circuit state and the closed circuit state of the switching circuit 113 respectively correspond to the open state and the closed state of the key switch 11.

Figure 3:
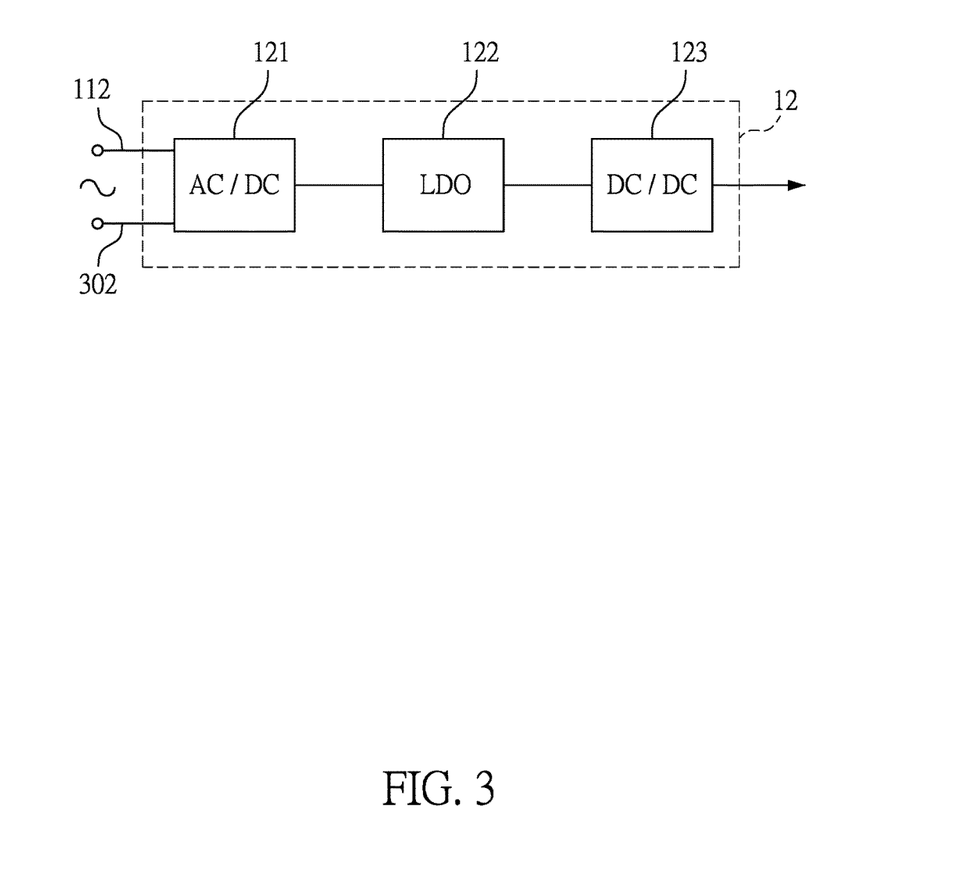
FIG. 3 is a circuit block diagram of the AC-to-DC power supply in the preferred embodiments shown in FIG. 1A and FIG. 1B.

Referring to FIG. 3, the AC-to-DC power supply 12 includes an AC-DC voltage converter 121, a low dropout (LDO) regulator 122, and a DC-DC voltage converter 123. The AC-to-DC power supply 12 takes input power from the common output terminal 112 of the key switch 11 and the other polarity 302 of the AC power source 30, and converts the input power into a DC power source which is supplied to the power state coupling circuit 13, the driving circuit 14, and the controller 15.

Figure 4:
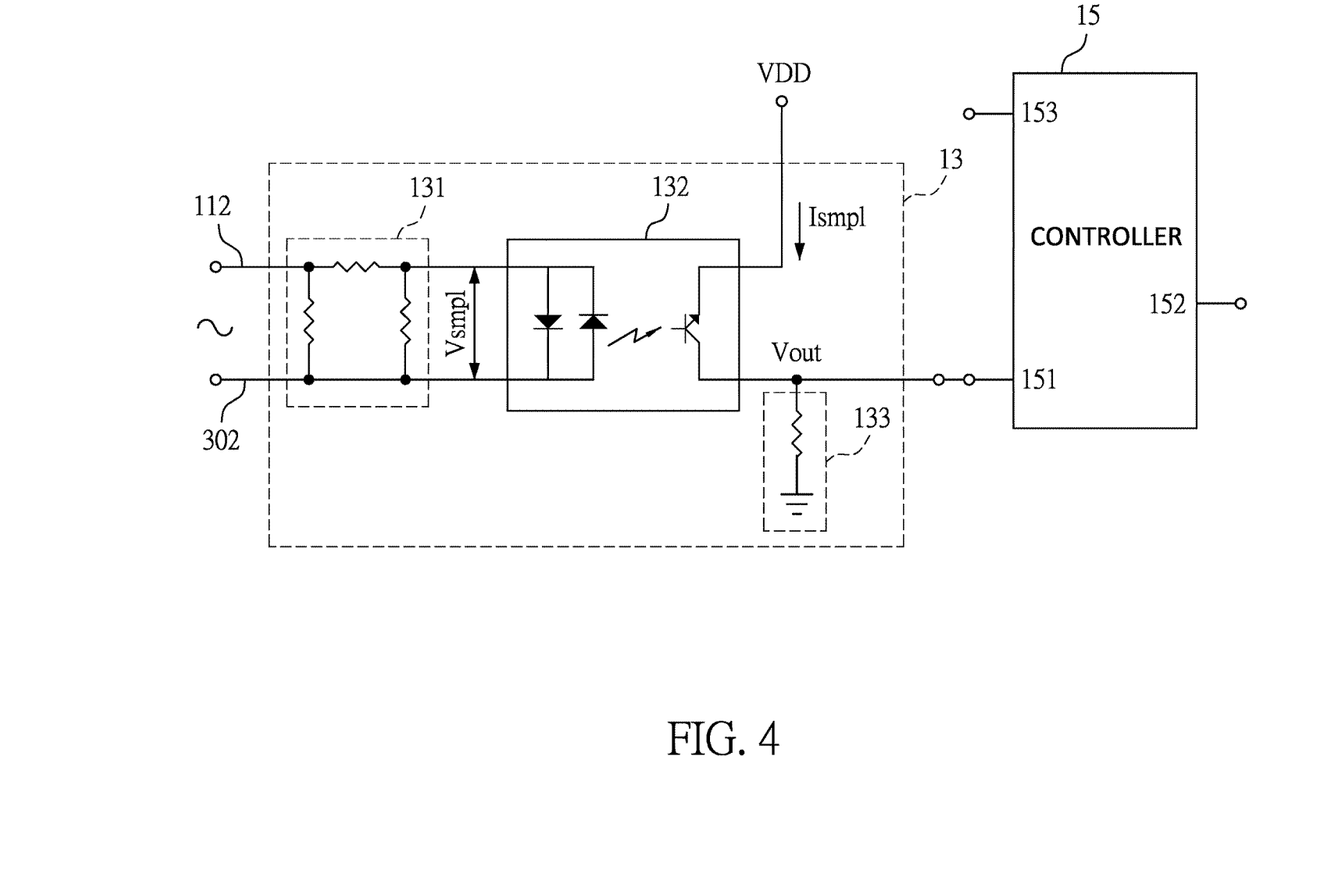
FIG. 4 is a circuit block diagram of the power state coupling circuit in the preferred embodiments shown in FIG. 1A and FIG. 1B.

Referring to FIG. 4, the power state coupling circuit 13 includes a resistor set 131, an electro-optic coupling unit 132, and an output resistor 133, wherein the resistor set 131 takes the power input from the common output terminal 112 of the key switch 11 and the other polarity 302 of the AC power source 30, and uses the resistor set 131 to sample a sampling voltage Vsmpl by resistor ratios. The sampling voltage Vsmpl will then be transmitted to the electro-optic coupling unit 132 to get an output current Ismpl, and the output current Ismpl then flows through the output resistor 133 to generate an output voltage Vout. Since the direction of the output current Ismpl is fixed, the output voltage Vout is a direct voltage signal, wherein the electro-optic coupling unit 132 is based on the light coupling between a bi-directional light emitting diode pair and a photo-sensitive transistor, and the bi-directional light emitting diode pair takes in the sampling voltage Vsmpl to produce light coupled to the photo-sensitive transistor to generate the output current Ismpl. The electro-optic coupling unit 132 may be, for example, the light coupler product IL250 manufactured by Vishay® Company. Then, the output voltage Vout is transmitted to an input pin 151 of the controller 15, and the controller 15 will base on the waveform of the output voltage Vout to determine whether the switching element 113 of the key switch 11 is in the closed circuit state or the open circuit state.

As described above, if the switching element 13 is in the open circuit state, the output voltage Vout will have a rectified waveform which after passing through the power state coupling circuit 13 will generate a waveform with a frequency, say, Fc; on the other hand if the switching element 13 is in the closed circuit state, the output voltage Vout will have a normal AC waveform which after passing through the power state coupling circuit 13 will generate a waveform with a frequency twice of Fc. Hence the controller 15 can determine whether the switching element 113 of the key switch 11 is in the closed circuit state or the open circuit state based on the frequency of the voltage waveform from the input pin 151.

Figure 5:
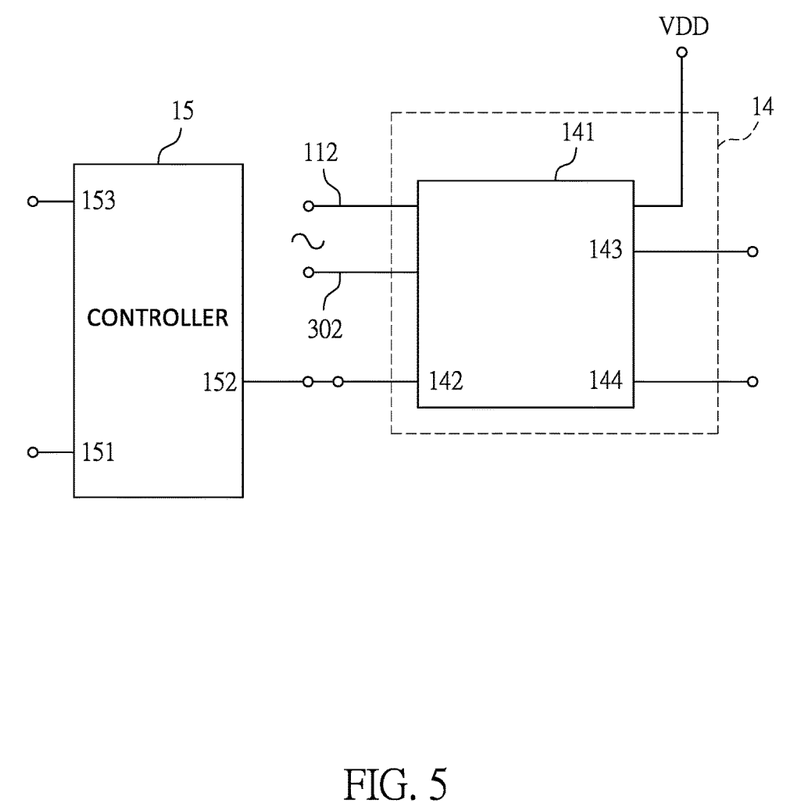
FIG. 5 is a circuit block diagram of the driving circuit in the preferred embodiments shown in FIG. 1A and FIG. 1B.

Referring to FIG. 5, the driving circuit 14 includes a solid state relay 141, a signal input terminal 142, a pair of power output terminals 143,144 and a pair of AC power input terminals; the pair of AC power input terminals are connected to the common output terminal 112 of the key switch 11 and to the other polarity 302 of the power source 30, and take in the input power thereby; the output pin 152 of the controller 15 will transmit an ON/OFF signal to the signal input terminal 142 of the solid state relay 141 to control the ON/OFF of the solid state relay 141, so as to control the pair of power output terminals 143,144 of the driving circuit 14 which subsequently controls whether or not to supply power to the electric load 20; for example, when the electric load 20 is a lamp, controlling its power means to be able to control the ON/OFF of the lamp.

Referring to FIG. 5, in another embodiment, the output pin 152 of the controller 15 outputs a PWM signal to the signal input terminal 142 to control the ON/OFF duty cycle of the solid state relay 141, so as to control output duty cycle of the pair of the power output terminals 143,144 of the driving circuit 14 which subsequently controls the duty cycle of the power supplying to the electric load 20, for example, when the electric load 20 is a lamp, controlling the duty cycle of its power means to be able to adjust the brightness of the lamp.

Besides the input pin 151, the output pin 152 and the DC power input 153 described above, the controller 15 may further include a wireless communication interface, such as WiFi, BT, Zigbee, 802.11a/b/g, or Home RF. So the controller 15 may receive and transmit wireless signals; hence the controller 15 can control the power ON/OFF as well as the duty cycle of the supplying power for the electric load 20 according to the information of the wireless signals received from the wireless interface.

As described above, the controller 15 will base on the voltage waveform of the input pin 151 to determine whether the switching element 113 of the key switch 11 is in the open circuit state or the closed circuit state. The controller 15 may further utilize firmware/software and parameters stored in its internal memory, external memory, or information received from the wireless communication interface to define and to determine user operation events over the key switch 11, for example, a single-click event (for example, continuously pressing for less than 2 seconds), a consecutive-N-clicks event (for example, N is a positive integer greater than 1), or a long-click event (for example, continuously pressing for more than 8 seconds), etc., and thus the controller 15 controls the output waveforms of its output pin 152 according to the above-mentioned user operation events. More detailed user operation events are described as follows:

Long-click event: when the key switch has entered the closed state over a T0 time interval.

Triggering event: when the key switch has entered the closed state over a T1 time interval.

Re-triggering event: after the triggering event occurred, the key switch had entered the open state not yet over a T2 interval, and then the key switch entered the closed state again and has stayed over the T1 interval.

Single-click event: after the triggering event occurred, the key switch has entered the open state over a T3 interval, wherein the T3 interval is longer than the T2 interval.

Consecutive-N-clicks event: after the re-triggering event occurred, N–2 triggering events occurred, until the key switch has entered the open state over the T3 interval (N is a positive integer greater than 1).

In another preferred embodiment, the above-mentioned events are otherwise defined as follows:

Long-click event: when the key switch has entered the open state over a T0 time interval.

Triggering event: when the key switch has entered the open state over a T1 time interval.

Re-triggering event: after the triggering event occurred, the key switch had entered the closed state not yet over a T2 interval, then the key switch entered the open state again and has stayed over the T1 interval.

Single-click event: after the triggering event occurred, the key switch has entered the closed state over a T3 interval, wherein the T3 interval is longer than the T2 interval.

Consecutive-N-clicks event: after the re-triggering event occurred, N–2 triggering events occurred, until the key switch has entered the closed state over the T3 interval (N is a positive integer greater than 1).

The controller 15 may use the information received by the wireless communication interface to update the aforementioned definitions of the user operation events as well as the parameters, for example, accepting only double clicks, or changing the values of time the intervals T0, T1, T2, or T3.

Figure 6:
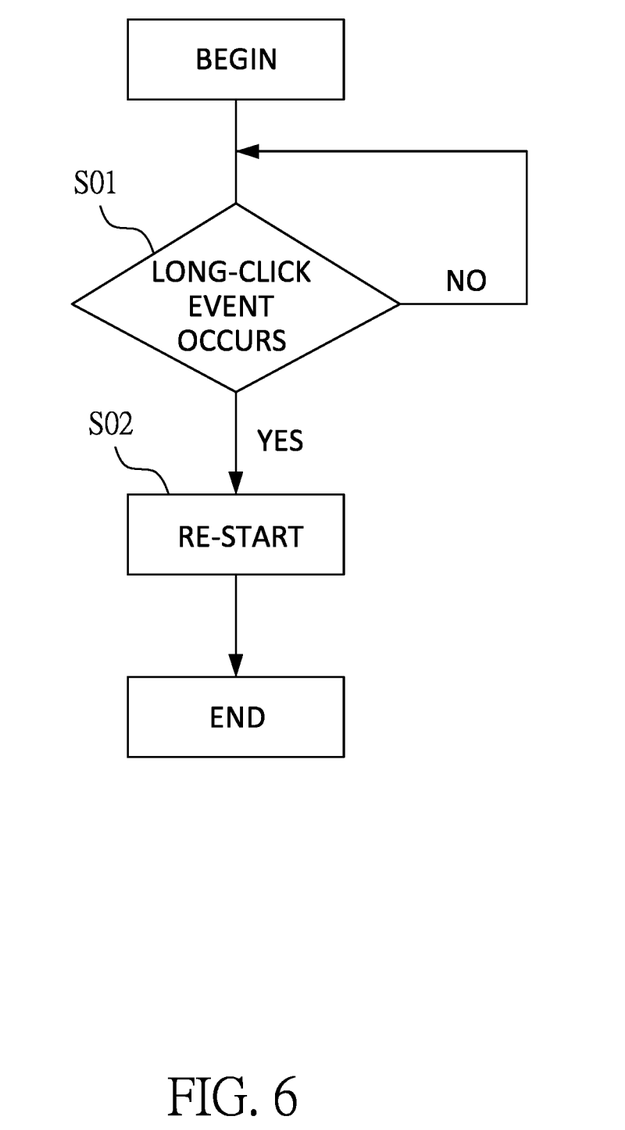
FIG. 6 is a flow chart of a firmware/software of this invention.
Figure 7:
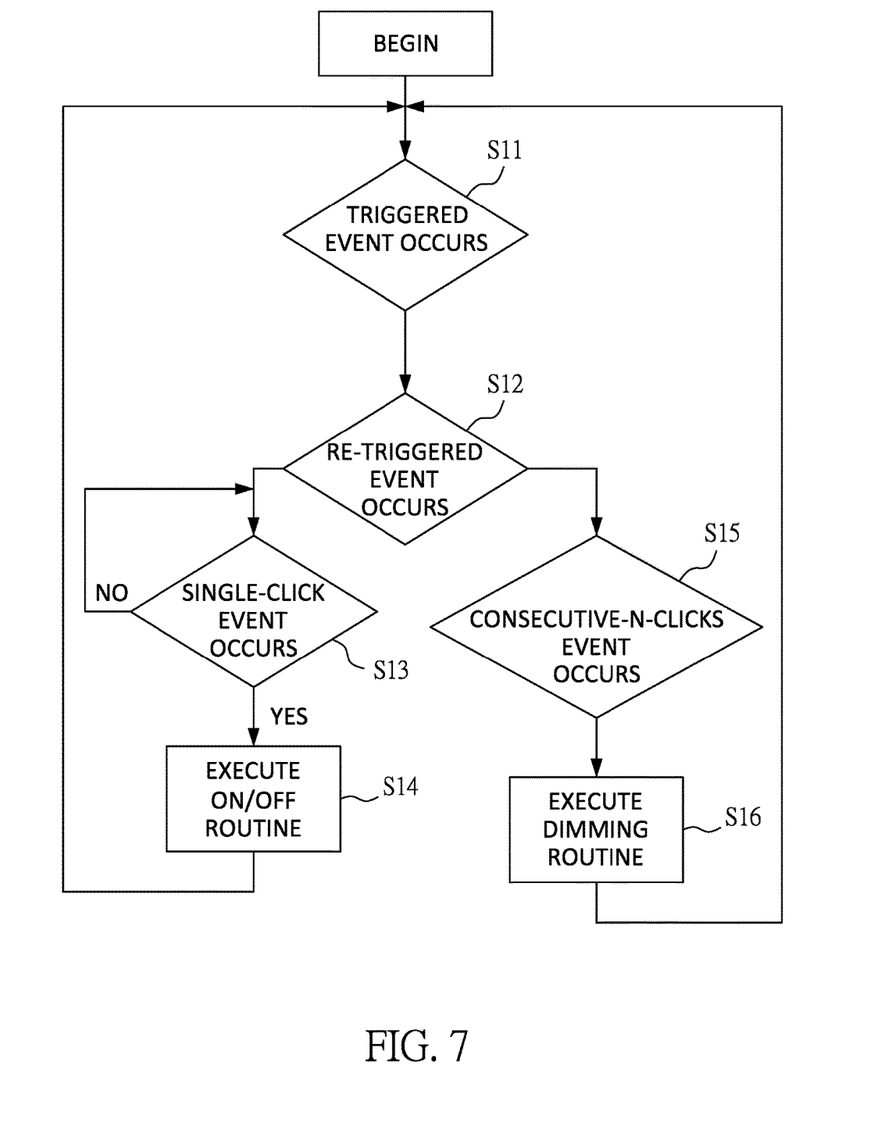
FIG. 7 is a flow chart of another firmware/software of this invention.

Referring to FIG. 6 and FIG. 7, FIG. 6 and FIG. 7 are flow charts for firmware/software of this invention, including: a restart flow, an ON/OFF flow, and a brightness adjusting flow, and the controller 15 may execute these flows and related routines in parallel. In the restart flow, the controller 15 waits for a long-click event to occur (S01), when the long-click event occurs, the controller 15 will execute a restart routine (S02) which includes resetting some state variables and parameters to default values. In the ON/OFF or the light adjusting flow, the controller 15 will check whether or not the key switch 11 is triggered (S11), when the key switch 11 is triggered, the controller will check if the key switch 11 is re-triggered (S12), when the key switch 11 is not re-triggered, then the controller 15 will check if the single-click event occurs (S13), when the key switch 11 is re-triggered, then the controller will check if the consecutive-N-clicks event occurs (S15); moreover, if in the step S13, the single-click event occurs, then the controller 15 will execute the ON/OFF routine (S14), and if in step S15 the consecutive-N-clicks event occurs, then the controller 15 will execute a dimming routine (S16).

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A dimming switch device comprising:
   a key switch comprising
      a common input terminal;
      a common output terminal;
      a switching element having an input terminal and an output terminal, wherein the switching element is controllable to be open-circuit or closed-circuit; and
      a rectifying diode having an input terminal and an output terminal;
      wherein the input terminal of the switching element and the input terminal of the rectifying diode are electrically connected to the common input terminal and further electrically connected to one polarity of an AC power source; and the output terminal of the switching element and the output terminal of the rectifying diode are electrically connected to the common output terminal; and
   a power state coupling circuit comprising:
      a pair of input terminals electrically connected to the common output terminal of the key switch and the other polarity of said AC power source; and
      an output terminal;
      wherein the power state coupling circuit converts an AC voltage of the pair of input terminals to a DC signal which is transmitted to the output terminal of the power state coupling circuit; and
   a controller comprising:
      an input pin electrically connected to the output terminal of the power state coupling circuit;
      wherein the controller determines whether the switching element is open-circuit or closed-circuit according to voltage waveforms from the input pin.

2. The device as claimed in claim 1, wherein the key switch is separately disposed in a position away from the power state coupling circuit and the controller, and only one pair of power cables are connected between the key switch and other circuits in the dimming switch device, and the power cables transmit power and a signal to other circuits in the dimming switch device to indicate whether the switching element is in an open circuit state or in a closed circuit state.

3. The device as claimed in claim 1, wherein the controller determines user operation events over the key switch, and the user operation events include triggering, re-triggering, single-click, consecutive-N-clicks (N is a positive integer greater than 1), or long-click.

4. The device as claimed in claim 3, wherein the controller further comprises:
   a wireless communication interface, which receives and transmits wireless signals;
   wherein the controller determines methods and parameters for determining the user operation events according to information of the wireless signals received by the wireless communication interface.

5. The device as claimed in claim 1, further comprising:
   a driving circuit comprising:
      a pair of AC input terminals electrically connected to the common output terminal of the key-switch and the other polarity of the AC power source;
      a signal input terminal;
      a pair of power output terminals for electrically connecting to an electric load; and
   an output pin of the controller which is electrically connected to the signal input terminal of the driving circuit, wherein the controller determines voltage waveforms of the output pin as well as voltage waveforms of the pair of power output terminals of the driving circuit according to the voltage waveforms of the input pin, so as to control the electric load.

6. The device as claimed in claim 5, further comprising:
   an AC-to-DC power supply, which inputs AC power from the common output terminal of the key switch and the other polarity of the AC power source and converts the AC power into DC power, and supplies the DC power to the power state coupling circuit, the driving circuit, and the controller.

7. A method for determining user operation events of a dimming switch device, comprising the following steps:
   providing a dimming switch device comprising a key switch which is operated to be in a first state or a second state, wherein the key switch outputs a signal to indicate whether the key switch is in the first state or the second state;
   defining a long-click event as: when the key switch has entered the first state over a T0 time interval;
   providing a controller, wherein based on said signal, the controller waits for the long-click event to occur, and once the long-click event occurs, the controller executes a re-start routine, and otherwise the controller continues to wait for the long-click event to occur.

8. The method as claimed in claim 7, wherein
   the first state is a closed state and the second state is an open state; and
the T0 time interval is more than 8 seconds.

9. The method as claimed in claim 7, wherein
   the first state is an open state and the second state is a closed state; and
the T0 time interval is more than 8 seconds.

10. A method for determining user operation events of a dimming switch device, comprising the following steps:
   providing a dimming switch device comprising a key switch which is operated to be in a first state or a second state, wherein the key switch outputs a signal to indicate whether the key switch is in the first state or the second state;
   defining a triggering event as: when the key switch has entered the first state over a T1 time interval;
   defining a re-triggering event as: after the triggering event occurred, the key switch had entered the second state not yet over a T2 interval, and then the key switch entered the first state again and has stayed over the T1 interval;
   defining a single-click event as: after the triggering event occurred, the key switch has entered the second state over a T3 interval, wherein the T3 interval is longer than the T2 interval;
   providing a controller, wherein based on said signal, the controller checks if the triggering event occurs;
   when the triggering event occurs, the controller checks if the re-triggering event occurs;
   when the re-triggering event doesn't occur, the controller checks if the single-click event occurs, and when the single-click event occurs, the controller executes an ON/OFF routine.

11. The method as claimed in claim 10, wherein
   the first state is a closed state and the second state is an open state; and
the T1 time interval is between 0.05 second and 3 seconds, the T2 time interval is 1 second, and the T3 time interval is longer than the T2 time interval by at least 0.001 second.

12. The method as claimed in claim 10, wherein
   the first state is an open state and the second state is a closed state; and
the T1 time interval is between 0.05 second and 3 seconds, the T2 time interval is 1 second, and the T3 time interval is longer than the T2 time interval by at least 0.001 second.

13. A method for determining user operation events of a dimming switch device, comprising the following steps:
   providing a dimming switch device comprising a key switch which is operated to be in a first state or a second state, wherein the key switch outputs a signal to indicate whether the key switch is in the first state or the second state;
   defining a triggering event as: when the key switch has entered the first state over a T1 time interval;
   defining a re-triggering event as: after the triggering event occurred, the key switch had entered the second state not yet over a T2 interval, and then the key switch entered the first state again and has stayed over the T1 interval;
   defining a consecutive-N-clicks event (N being a positive integer greater than 1) as: after the re-triggering event occurred, N−2 triggering events occurred, until the key switch has entered the second state over the T3 interval;
   providing a controller, wherein based on said signal
   the controller checks if the triggering event occurs;
   when the triggering event occurs, the controller checks if the re-triggering event occurs;
   when the re-triggering event occurs, the controller checks if the consecutive-N-clicks event occurs, and when the consecutive-N-clicks event occurs, the controller executes a dimming routine.

14. The method as claimed in claim 13, wherein
   the first state is a closed state and the second state is an open state; and the T1 time interval is between 0.05 second and 3 seconds, the T2 time interval is 1 second, and the T3 time interval is longer than the T2 time interval by at least 0.001 second.

15. The method as claimed in claim 13, wherein
the first state is an open state and the second state is a closed state; and the T1 time interval is between 0.05 second and 3 seconds, the T2 time interval is 1 second, the T3 time interval is longer than the T2 time interval by at least 0.001 second.

\* \* \* \* \*